United States Patent
Burnley

(10) Patent No.: US 10,355,998 B2
(45) Date of Patent: Jul. 16, 2019

(54) ADAPTIVE VIDEO OVER MULTICAST

(71) Applicant: Cisco Technology, Inc., San Jose, CA (US)

(72) Inventor: Thomas P. Burnley, Winchester (GB)

(73) Assignee: Cisco Technology, Inc., San Jose, CA (US)

(*) Notice: Subject to any disclaimer, the term of this patent is extended or adjusted under 35 U.S.C. 154(b) by 175 days.

(21) Appl. No.: 15/442,924

(22) Filed: Feb. 27, 2017

(65) Prior Publication Data
US 2018/0248806 A1 Aug. 30, 2018

(51) Int. Cl.
| | |
|---|---|
| *H04L 12/825* | (2013.01) |
| *H04L 12/931* | (2013.01) |
| *H04L 1/00* | (2006.01) |
| *H04L 29/06* | (2006.01) |
| *H04N 21/00* | (2011.01) |
| *H04N 19/177* | (2014.01) |
| *H04N 19/184* | (2014.01) |
| *H04N 19/146* | (2014.01) |
| *H04N 19/65* | (2014.01) |

(52) U.S. Cl.
CPC .......... *H04L 47/25* (2013.01); *H04L 1/0002* (2013.01); *H04L 1/0014* (2013.01); *H04L 1/0018* (2013.01); *H04L 49/201* (2013.01); *H04L 65/602* (2013.01); *H04L 65/604* (2013.01); *H04N 21/00* (2013.01); *H04N 19/146* (2014.11); *H04N 19/177* (2014.11); *H04N 19/184* (2014.11); *H04N 19/65* (2014.11)

(58) Field of Classification Search
CPC ...... H04L 1/0018; H04L 47/25; H04L 49/201
See application file for complete search history.

(56) References Cited

U.S. PATENT DOCUMENTS

| | | | |
|---|---|---|---|
| 6,961,341 B1 | 11/2005 | Krishnan | |
| 7,418,190 B2 | 8/2008 | Green | |
| 8,230,105 B2 | 7/2012 | Melnyk et al. | |
| 8,239,564 B2 | 8/2012 | Freelander et al. | |
| 9,100,461 B2* | 8/2015 | Lemmons | H04N 21/2355 |
| 9,253,229 B1* | 2/2016 | Strothmann | H04N 21/2662 |
| 9,402,107 B2* | 7/2016 | Gonder | H04L 65/605 |

(Continued)

FOREIGN PATENT DOCUMENTS

WO 2006077500 A1 7/2006

*Primary Examiner* — Asad M Nawaz
*Assistant Examiner* — Saad A. Waqas
(74) *Attorney, Agent, or Firm* — Patterson + Sheridan, LLP

(57) ABSTRACT

Techniques are described for managing streaming video profile selections of downstream client devices for a network device. The network device receives multicast network communications for a first video streaming profile of a plurality of video streaming profiles, for a video content item. The network device is subscribed to multicast communications from an upstream network device, for a video stream corresponding to the first video streaming profile. Embodiments determine network state information at the network device that specifies at least a measure of upstream network error. Upon determining that the network state information satisfies one or more criteria, data communications from the network device to a downstream client device for the video stream corresponding to the first video streaming profile are throttled.

20 Claims, 12 Drawing Sheets

(56) References Cited

U.S. PATENT DOCUMENTS

| | | | |
|---|---|---|---|
| 2003/0140159 A1* | 7/2003 | Campbell | H04L 29/06 709/231 |
| 2008/0259796 A1 | 10/2008 | Abousleman et al. | |
| 2008/0260042 A1* | 10/2008 | Shah | H04N 19/197 375/240.25 |
| 2010/0226444 A1 | 9/2010 | Thevathasan et al. | |
| 2010/0254462 A1 | 10/2010 | Friedrich et al. | |
| 2013/0205002 A1* | 8/2013 | Wang | H04L 69/16 709/224 |
| 2014/0164641 A1* | 6/2014 | Ye | H04L 47/127 709/235 |
| 2015/0172193 A1* | 6/2015 | Sinha | H04L 47/12 370/230 |
| 2016/0269459 A1* | 9/2016 | Harden | H04L 65/602 |
| 2017/0171264 A1* | 6/2017 | Salomons | H04N 21/2402 |
| 2017/0171589 A1* | 6/2017 | Phillips | G11B 27/10 |
| 2017/0325120 A1* | 11/2017 | Szilagyi | H04W 28/24 |

\* cited by examiner

ADAPTIVE VIDEO OVER MULTICAST

TECHNICAL FIELD

Embodiments presented in this disclosure generally relate to streaming content, and more specifically, embodiments disclosed herein relate to techniques for optimizing ABR streams within a network.

BACKGROUND

As video transmission systems have matured, digital video is more readily available via a variety of different communications systems and networks. Specifically, digital video, such as television programs, can be transmitted as multicast digital bit streams of video signals to users over networks. Multicast digital bit streams typically include digital video frames. A predetermined number of frames is conventionally referred to as a Group of Pictures (GOP). The GOP lengths are typically 15 or 30 frames. With more advanced video formats, such as Advanced Video Coding (AVC) and/or Windows Media 9 (WM9), the GOP length can be substantially longer in order to reduce the bit rate.

In order to reduce costs and simplify the amount of effort associated with video transmission, different video compression/de-compression techniques have been developed and established. Some of the better known and more widely adopted video compression/de-compression standards include Motion Picture Experts Group 2 (MPEG-2) data streams and Motion Picture Experts Group 4 (MPEG-4) data streams. Hence, television programs are often transmitted over the network as Motion Picture Experts Group 2 (MPEG-2) data streams or Motion Picture Experts Group 4 (MPEG-4) data streams. Conventionally, for purposes of video compression/decompression, a video stream is processed one frame at a time.

Compressed video transmission streams typically include a variety of different compression frame types. With MPEG-2 and MPEG-4, the bit streams generally include three different types of frames including Intra-frames, Predictive frames, and Bidirectional interpolated frames. In a typical decoding process, Intra-frames (I-frames) can be decoded independently without the need of referencing another frame. Thus, GOPs typically start with an I-frame. Predictive frames (P-frames) can be decoded by referencing a previous I-frame or P-frame. Bidirectional interpolated frames (B-frames) can be predicted from a previous and a following P-frame or I-frame. For a given video stream, all three ways of coding are attempted and the best and most efficient combination is utilized. For example, a common MPEG-2 video stream can be 15 frames long and have the sequence IBBPBBPBBPBBPBB.

Typically, a video stream, such as a MPEG-2 data stream, is transmitted from a multicast source to a router and/or switch via a network, e.g., an Internet Protocol (IP) distribution network. And upon receipt of the video stream, the router then transmits the video stream to a user device, such as a set-top box. Such a router (e.g., the user's Internet gateway) can potentially receive multiple multicast video streams at one time (e.g., one or more streams for each of a plurality of broadcast channels), and client devices (e.g., dedicated streaming devices such as the set-top box, mobile devices, tablet devices, etc.) can request specific streams to be output for display.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
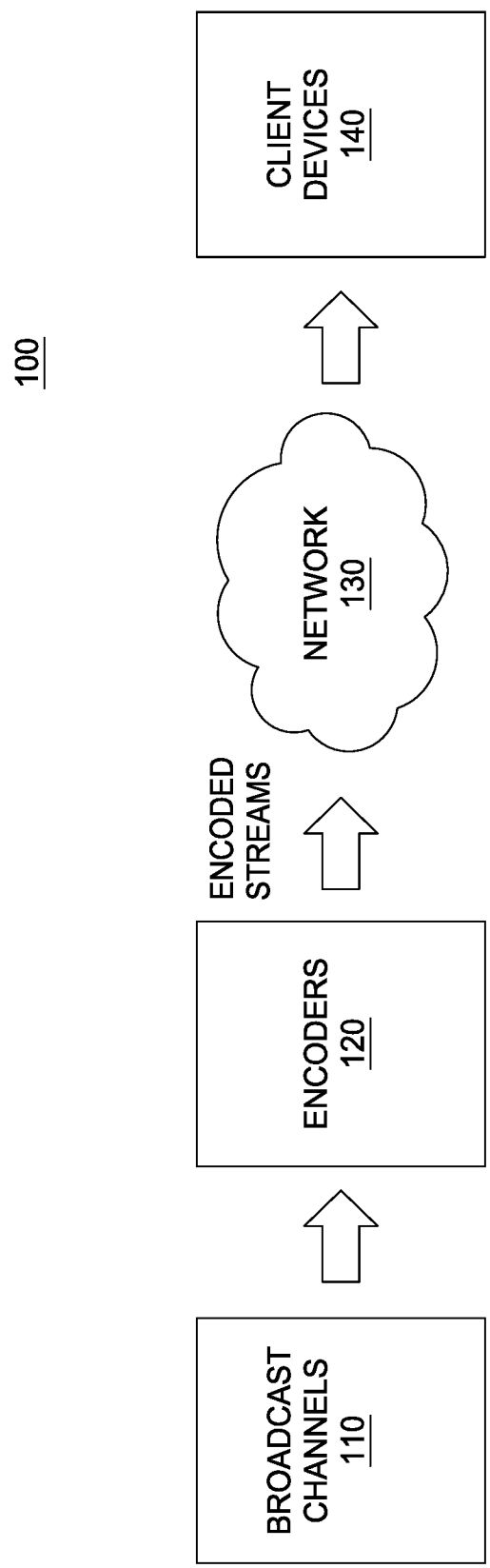
FIG. 1 illustrates a system for delivering encoded video streams to client devices configured with an Adaptive Bitrate (ABR) profile selection component, according to one embodiment described herein.

One embodiment presented in this disclosure provides a method, system and non-transitory medium for influencing downstream video streaming client behavior. The method, system and non-transitory medium include receiving, at a network device, multicast network communications for a first video streaming profile, of a plurality of video streaming profiles, for a video content item. In such an embodiment, the network device is subscribed to multicast communications from an upstream network device, for a video stream corresponding to the first video streaming profile. The method, system and non-transitory medium also include determining network state information at the network device that specifies at least a measure of upstream network error. Additionally, upon determining that the network state information satisfies one or more criteria, the method, system and non-transitory medium throttling data communications from the network device to a downstream client device for the video stream corresponding to the first video streaming profile.

Example Embodiments

In many instances, content providers can provide multiple Adaptive Bitrate (ABR) streams for a single broadcast channel. Generally speaking, multiple different ABR streams (e.g., at varying bitrates) can be provided for each of a plurality of broadcast channels, and client devices can be configured with logic to select one of the ABR streams that is optimal for the given client device. That is, it is generally preferable for a client device to display the highest quality video stream possible, and since network resources and processing capabilities can vary greatly between client devices, the optimal video stream can vary greatly between client devices. As an example, a very high bitrate encoding may be optimal for a dedicated streaming device on a high-speed network, while a relatively lower bitrate encoding may be optimal for a mobile device on a mobile network. As such, by providing multiple encodings at varying bitrates for each broadcast channel, content providers can better ensure that client devices can retrieve a stream that is close to optimal for the particular client device.

Many video clients are configured with logic to dynamically select between a plurality of video streaming profiles for a given instance of video content. For example, a content distribution network (CDN) could provide a plurality of different video streaming profiles for the instance of video content, with each profile corresponding to a respective instance of the video content encoded in a respective bitrate. Generally, such video clients monitor the rate at which they receive packets of video data and to scale the video streaming profile accordingly. For example, upon determining that the packets are not being received fast enough, the client devices could select a lower bitrate profile to help prevent buffer underrun and pausing of the streaming video. As another example, when the client determines that the video data is being received sufficiently quickly, the client could request a higher bitrate profile to improve the quality of the video streaming experience.

Generally, multicast ABR solutions have a sender device that extracts data for each available ABR profile from a source and transmits the data for each profile to its own multicast IP destination. For example, each ABR profile can correspond to a respective bitrate encoding of video content. When requesting video data for a video stream, the requests from the client video players can be redirected to from their local receiver device (e.g., a network gateway device for a home network, a set-top box, etc.). Generally, the client can specify the video stream being requested (e.g., using a unique identifier corresponding to the video stream) and an ABR profile for the video stream that is to be used. To supply video segments from the video stream, the receiver device can subscribe to the multicast stream containing the specified ABR profile.

As the ABR profile in such an example is selected by the client device, a network device (e.g., a network device managed by an Internet Service Provider (ISP) that processes requests for a substantial number of home networks and client devices) can be forced to subscribe to a significant number of multicast streams for ABR profiles of various video streams from an upstream network device. Likewise, the upstream network device will need to subscribe to the multicast streams as well, and so on until the content is received directly from the source (e.g., a Content Distribution Network (CDN). Even within a given network, various client devices may request different ABR profiles (e.g., a set-top box device may request a highest quality ABR profile, while a mobile device with a weaker Wi-Fi® connection may request a lower quality ABR profile due to the perceived lack of bandwidth). Thus, even within the same local network, different client devices may request different ABR profiles, further increasing the number of multicast subscriptions needed by upstream network devices.

When the upstream network becomes congested with traffic or otherwise experiences problems, the upstream network devices can become unable to supply requested video segments to downstream client devices in sufficient time for the playback of the video content. Available multicast ABR solutions use error correction and retransmission to ensure the integrity of the multicast data under conditions where the bandwidth available exceeds that that is required. When the upstream bandwidth is constrained, however, multicast ABR receivers (e.g., a network gateway device for a home network) may eventually fall back to Transmission Control Protocol (TCP) unicast data communications. While such behavior may be optimal behavior in some circumstances, doing so in a situation where the upstream network bandwidth is constrained further exacerbates the problem by further restricting bandwidth, as now the network devices within the network are requested to transmit the unicast data packets in addition to the multicast data packets. While some network operators reserve sufficient User Datagram Protocol (UDP) bandwidth for the services that it wishes to multicast to prevent this situation from occurring, such a solution is less dynamic in nature then TCP-based ABR streams and diminishes the advantages of adaptive video in general.

Generally, when a video player on a client device downloads a packet faster than it takes to consume the video data contained within the packet, the video player can determine that the download of the packet (which is of known size) will complete sufficiently quickly by measuring the bitrate during the time the packet was being downloaded. As such, the video player will remain on the current ABR profile. When downloading a subsequent packet where the bitrate is lower, but still sufficient for the player to determine that the packet will be downloaded at a rate faster than consumption, the video player can choose to remain on the current ABR profile. At some point, where the video player determines that the download of a packet will exceed the time that it would take to consume the packet (risking a decoder underrun), the video player can take corrective action, abandoning the download of the packet at that bitrate and opting to download a lower bitrate version of the packet. While downloading the lower bitrate packet, the video player can again check whether the time required to download the packet at the then available bitrate is sufficient once again. The video player could continue to download lower bitrate packets, upon determining that such downloads will complete sufficiently quickly to be played back on schedule, but the downloads are not occurring quickly enough to warrant attempting to download the packets at a higher bitrate ABR profile. If the video player subsequently determines that there is sufficient speed to abandon the download of the lower bitrate packet and attempt to download the high bitrate packet, the video player can then request data packets for the higher bitrate BR profile.

Generally, the adaptation logic in the video player can account for certain network conditions (e.g., local network conditions) but, due to an upstream conversion from multicast to unicast, the video player may be unable to determine conditions on the network as a whole (e.g., where ample bandwidth may be available on the local network, but network congestion is occurring at an upstream network location beyond the multicast to unicast conversion). Particularly in situations where the local network gateway device is subscribed to the multicast stream and has already received the data packets from its upstream network device, the video player logic cannot accurately determine the network condition by measuring the bitrate of the received packets, as the transmission of these data packets is limited only by the conditions of the local network. As a result, in such a scenario, all of the packets are received at a bitrate commensurate with the connection between receiver and player (which is typically high).

In some cases, where the video player device can determine that the network bandwidth has become constrained, the network gateway device can abort the transmission of the current data packet and can request a retransmission at a lower bitrate ABR profile. As the network bandwidth continues to be constrained, however, an under-run can occur, e.g., where the packet that the video player client wishes to download has not been fully received. In this case the network gateway device may have little choice but to redirect the video player client back to a fully TCP path. However, as discussed above, redirecting clients from the UDP path to the TCP path simply further complicates the problem by placing an additional workload on the already constrained upstream network.

As such, embodiments described herein provide techniques for influencing the behavior of downstream video player client devices. Embodiments can receive, at a network device (e.g., a network gateway device for a home network), multicast network communications for a first video streaming profile, of a plurality of video streaming profiles, for a video content item. Generally, such a network device can be subscribed to multicast communications from an upstream network device, for a video stream corresponding to the first video streaming profile. Embodiments can determine a measure of network error at the network device. For example, the measure of network error could include a retransmission request rate for one or more downstream client devices. Upon determining that the network state information satisfies one or more criteria, embodiments can throttle data communications from the network device to a downstream client device for the video stream corresponding to the first video streaming profile. For example, upon determining that the retransmission request rate exceeds a threshold request rate, embodiments could throttle the data communications to the downstream client device, to influence the client device to shift to a lower bitrate ABR profile. Thus, in contrast to the situation above where the client device selects an ABR profile based on the bandwidth of its local network, embodiments can throttle the rate at which the video content is transmitted to the client device to create the appearance of reduced bandwidth, thereby causing the client device to shift to a lower bitrate ABR profile. When deployed across a network, embodiments can indirectly control the behavior of the client devices, thereby allowing the client devices to adapt to the available network bandwidth of the network as a whole, even though the client devices may not have knowledge of, or logic to account for, the upstream network congestion. As such, embodiments can enable the client devices to more gracefully downshift to lower bitrate ABR profiles, thereby helping to alleviate the network congestion while maintaining a quality video streaming experience for the client devices.

FIG. 1 illustrates a system for delivering encoded video streams to client devices, according to one embodiment described herein. As shown, the system 100 includes a plurality of broadcast channels 110, a plurality of encoders 120, a network 130 and a plurality of client devices 140. Generally, a master video stream is provided for each of the broadcast channels 110. Such a master video stream is typically a high-resolution video stream containing video content for the corresponding broadcast channel. The encoders 120 can then process the master video streams for the broadcast channels 110 to produce encoded ABR video streams. For example, three of the encoders 120 could be assigned to a particular one of the broadcast channels 110, and each of the three encoders could be configured to transcode the master video stream for the broadcast channel at a different bitrate. As an example, the three encoders could be configured to encode the master video stream for the broadcast channel at a relatively high bitrate, a relatively moderate bitrate and a relatively low bitrate.

The encoded streams could then be transmitted to the client devices 140 using the network 130. In doing so, the content provider could generate a manifest file specifying that the particular broadcast channel is available in the three different bitrates, and could transmit such a manifest file to the client devices 140 using the network 130. Each of the client devices 140 could be configured to process the manifest file and to determine which of the available bitrates is optimal for the particular client device. For example, a mobile client device could be configured to select the relatively low bitrate encoding, while a dedicated video streaming device on a high-speed network connection could be configured to select the relatively high bitrate encoding. Depending on the performance of the streaming of the selected encoding, the client devices could then dynamically adjust their selected encoding. Continuing the above example, if the mobile client device determines that data packets for the video stream are arriving well in advance of their playback time, the mobile client device could request to begin receiving data packets from the moderate bitrate encoding stream. As another example, if the dedicated streaming client device determines that packets are not arriving as quickly as expected and that buffer underrun is likely to occur, the dedicated streaming client device could request to begin receiving data packets from the moderate bitrate encoding stream.

According to one embodiment described herein, a network device within the network 130 can be configured to manage streaming video profile selections of downstream client devices 140. For example, such a network device could be configured with a video streaming management component, that is configured to receive multicast network communications for a first video streaming profile of a plurality of video streaming profiles, for a video content item. Generally, each of the plurality of video streaming profiles can correspond to video content encoded in a distinct manner (e.g., at a distinct bitrate). Such a network device can be subscribed to multicast communications from an upstream network device within the network 130, for a video stream corresponding to the first video streaming profile. Such a subscription can be semi-permanent (e.g., each day when the system is operating properly, multicast data corresponding to the video stream will be transmitted to the network device), for example for broadcast channel implementations, or can be dynamic (e.g., responsive to an occurrence of a particular event). Embodiments determine a measure of network error at the network device. Upon determining that the network state information satisfies one or more criteria, data communications from the network device to a downstream client device for the video stream corresponding to the first video streaming profile are throttled, so as to induce the logic on the downstream client device to shift to a lower bitrate ABR profile. Doing so can help to alleviate the network congestion and can better maintain the video streaming experience across the client devices 140.

Figure 2:
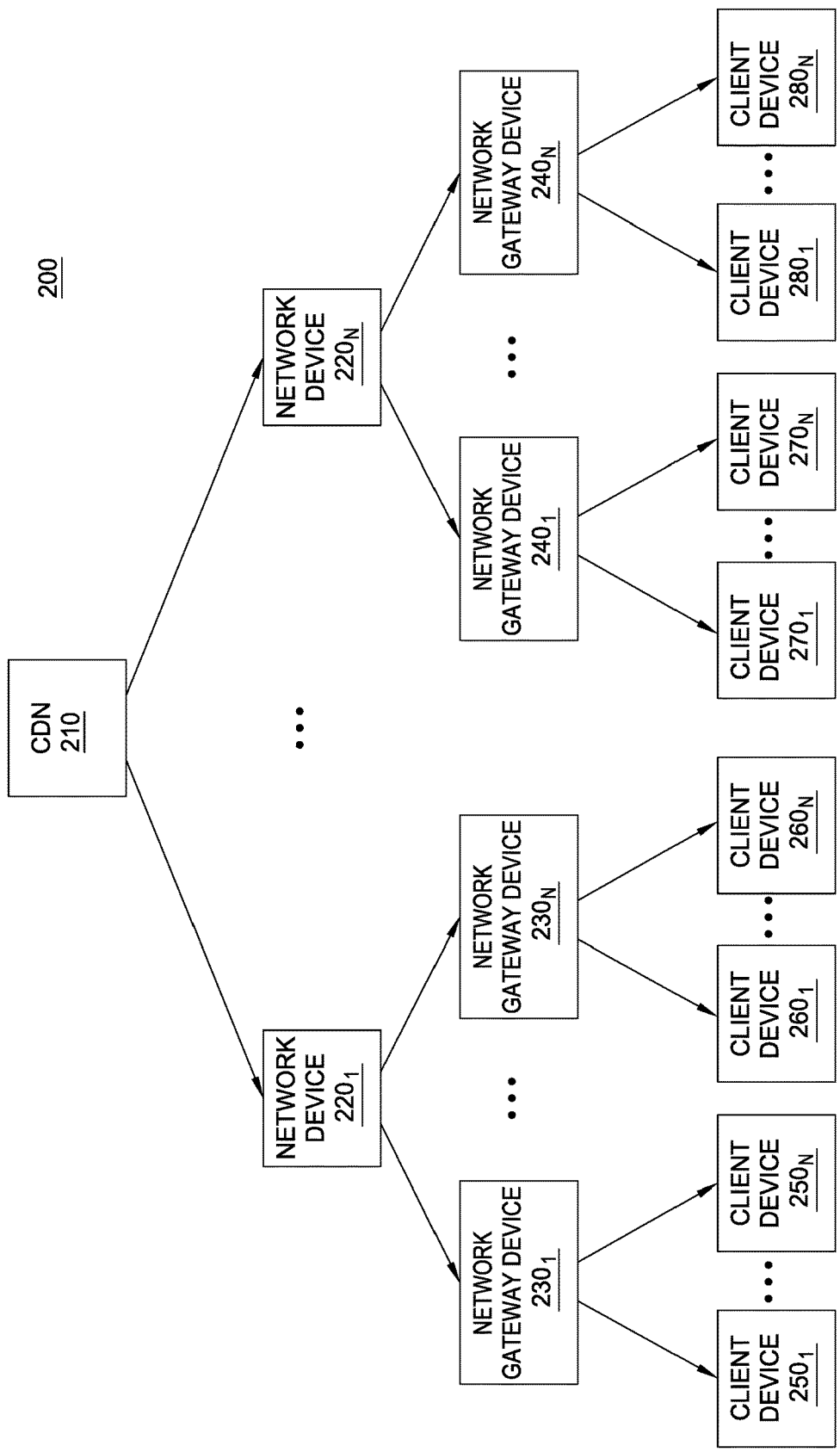
FIG. 2 illustrates a network topology for delivering encoded video streams to client devices, according to one embodiment described herein.

Generally, the encoded video streams generated by the encoders 120 can be transmitted to the client devices 140 using the network 130 in of different ways. One such way is through multicast communications, where encoded video streams are transmitted to all subscribing network devices within the network. FIG. 2 illustrates a network topology for delivering encoded video streams to client devices, according to one embodiment described herein. As shown, the network topology 200 includes a CDN 210, network devices $220_{1-N}$, network gateway devices $230_{1-N}$ and $240_{1-N}$, and client devices $250_{1-N}$, $260_{1-N}$, $270_{1-N}$, and $280_{1-N}$. In the depicted example, the network gateway devices $230_{1-N}$ and $240_{1-N}$ are configured to also serve as a router for a home network. Thus, for example, the client set-top box $240_1$ is configured to act as a router for the client device $270_{1-N}$.

In the depicted example, if the client device $270_1$ requests a particular encoded video stream for a particular broadcast channel, the client set-top box $240_1$ can be configured to subscribe to multicast transmissions from the network device $220_N$ for the particular encoded video stream. In turn, the network device 220N can subscribe to multicast transmissions from the CDN 210 for the particular encoded video stream. One advantage to such an embodiment is that the data packets for the particular encoded video stream can more easily be delivered to additional devices within the network topology 200. For example, if the client device $270_N$ also requests the particular encoded video stream for the particular broadcast channel, the client set-top box $240_1$ can simply provide the client device $270_N$ with the data packets for the particular encoded video stream already being received due to the client device $270_1$'s request. In other words, the particular encoded video stream can be provided to the client device $270_N$ without creating an additional network connection with the CDN 210, thereby reducing the workload on the CDN 210, the network device $220_N$ and the client set-top box $240_1$.m In some instances, the network gateway devices $230_{1-N}$ and $240_{1-N}$ are configured to subscribe to multicast transmissions for at least one video stream for each of the broadcast channels 110. In turn, the network devices $220_{1-N}$ can subscribe to multicast transmissions for the at least one video stream for each of the broadcast channels 110. While such an embodiment creates a constant flow of network traffic between the CDN 210 and the network devices $220_{1-N}$, and between the network devices $220_{1-N}$ and the network gateway devices $230_{1-N}$ and $240_{1-N}$, it enables any of the client devices $250_{1-N}$, $260_{1-N}$, $270_{1-N}$, and $280_{1-N}$ to retrieve data packets for the requested video streams from the corresponding client set-top box, using a local (and much faster) network connection. Moreover, regardless of the number of client devices $250_{1-N}$, $260_{1-N}$, $270_{1-N}$, and $280_{1-N}$, the workload on the CDN 210 remains constant, unlike conventional solutions where each of the client devices is configured to establish a separate network connection with the CDN 210 for streaming video content. As such, by transmitting the video streams through multicast transmission techniques, embodiments provide a more scalable video streaming solution relative to conventional techniques.

In the context of the present disclosure, one or more of the network devices $220_{1-N}$ and the network gateway devices $230_{1-N}$ and $240_{1-N}$ can be configured with a video streaming management component that is configured to selectively influence the behavior of downstream client devices (e.g., client devices $250_{1-N}$, $260_{1-N}$, $270_{1-N}$, and $280_{1-N}$). For example, the entity (e.g., a video streaming service provider) creating the UDP packets on the network could supply the CDN 210 with information about the video segment each packet belongs to and information about the video stream the packet corresponds to (e.g., the bitrate the video stream is encoded at). For a given video segment, the CDN 210 could add the duration of the overall video segment and the intended bitrate to each UDP packet contains a portion of video data for the video segment. The CDN 210 could determine such information, e.g., from the manifest of the ABR profile used to retrieve and construct the packet. Such information can be added, such that any receiver knows the duration of the video that the entire packet contains and can estimate the time that it will take to receive the entire packet.

As the network device configured with the video streaming management component stores the received packet in the cache, the video streaming management component can also store additional information regarding the duration that the packet took to download, and, if the segment is still being transmitted, extrapolates the likely time that the packet would take to be fully received over the multicast hop. As one of the client devices requests the cached data packets, the video streaming management component throttles the delivery of the packet via a transfer function (e.g., that considers the metrics measured on the upstream UDP connection, as well as metadata describing the video segment to which the packet belongs). By doing so, the logic on client device then naturally selects an ABR profile that is commensurate with the bandwidth available to the UDP connection (i.e., the throttled bandwidth according to the transfer function).

For example, in a scenario where the upstream UDP bandwidth is insufficient (i.e., where client devices are repeatedly requesting to switch ABR profiles), the receiving network device or network gateway device will see retransmit requests and FEC errors. The receiving device could calculate that the total time to receive this chunk is now video_segment_duration+extrapolated_network_delay and throttles the client connection accordingly. The client may then (depending on the adaptive algorithm implemented) select a lower bitrate stream in the same way that it would with a TCP connection. Of course, the present example assumes that the client is configured an adaptive streaming algorithm and logic for selecting an ABR profile based on a perceived measure of bandwidth.

If the estimated time for the receiving network device to receive the data over UDP is determined to be less than or equal to the time signaled in the first packet, the video streaming management component on the receiving network device can reduce the throttle on the transmission of data packets to downstream clients (i.e., using more bandwidth for the transmission of the data packets), such that many of the clients configured with logic for selecting ABR profiles will determine that an increase of ABR profile is possible (i.e., the clients will step up to a higher bitrate ABR profile). In one embodiment, the minimum throttle value applied is equal (or substantially equal) to the duration specified in the header supplied by the transmitting entity. Additionally, the function describing the correlation between Forward Error Correction (FEC) and/or retransmission rates and applied throttle may not be a linear function.

In one embodiment, the sender (e.g., CDN 210) can apply some bias as to which channels or instances of live video content will "step through" adaptive rates more quickly, by applying different expected transmission times for the video segments of the various channels. For example, the sender could tend to lower estimated transmission times for a particular video channel, relative to another video channel, in order to cause client devices to be more likely to switch to a lower bitrate ABR profile for the particular video channel. As an example, a particular channel that averages less views at a given point in time could be set with such lower estimated transmission times, relative to a more popular channel or a popular live sporting event. Doing so can influence client devices watching the particular channel to switch to a lower bitrate ABR profile before client devices watching the more popular channel, thereby providing more effective network bandwidth to the more popular channel.

Figure 3:
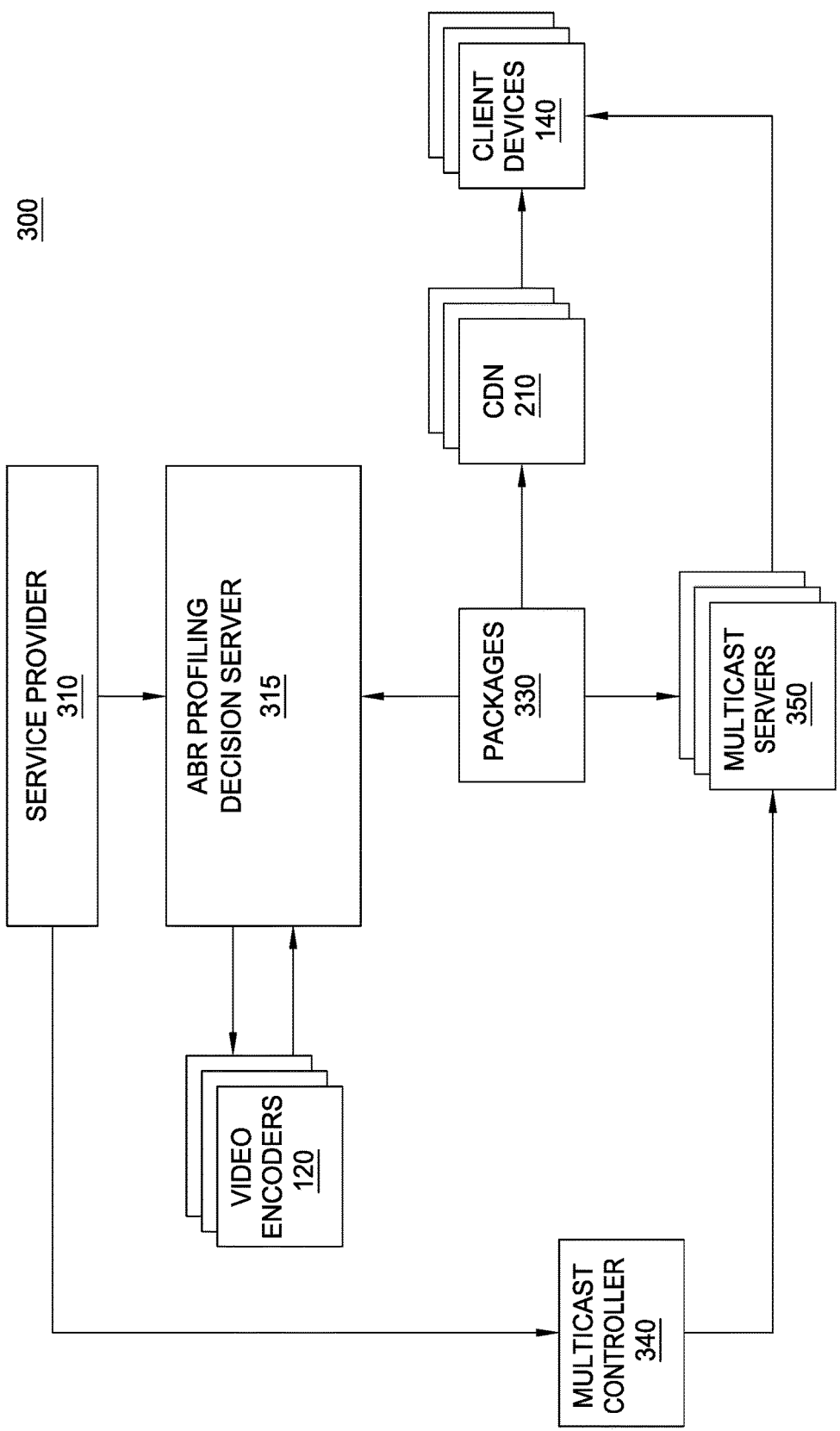
FIG. 3 illustrates a network topology for delivering encoded video streams to client devices, according to one embodiment described herein.

FIG. 3 illustrates a network topology for delivering encoded video streams to client devices, according to one embodiment described herein. As shown, the system 300 includes a service provide 310, an ABR profile decision server 315, a plurality of video encoders 120, packagers 330, CDNs 210, client devices 140, a multicast controller 340 and multicast servers 350.

Generally, the ABR profile decision server 315 is configured to determine an optimal allocation of the video encoders 120 to various broadcast channels, in order to optimally deliver ABR streams to the client devices 140. The ABR profile decision server 315 could then determine an optimal assignment of the set of available video encoders to the plurality of broadcast channels, by, for each of the plurality of broadcast channels, determining a respective number of video encoders to assign to the broadcast channel, based on the client consumption information, and determining a respective set of ABR streams to provide for the broadcast channel, using the assigned video encoders. In one embodiment, in determining the optimal allocation of the video encoders 120 to broadcast channels, the ABR profile decision server 315 is configured to scale the number of encoders 120 assigned to a given broadcast channel with the client demand for the broadcast channel. For example, a relatively popular broadcast channel may receive additional video encoders 120, to help assure that an optimal bitrate encoding is available for each of the client devices watching the popular broadcast channel. Doing so helps to ensure a positive streaming experience for the greatest number of users of the client devices 140. In doing so, however, the ABR profile decision server 315 can be configured to assign no fewer than a minimum threshold of encoders per broadcast channel. In some situations, where a particular broadcast channel is extremely unpopular, the ABR profile decision server 315 could assign only 1 or 2 encoders to the channel, as very few users will be affected if the channel is not available in an optimal bandwidth for certain client devices.

The video encoders 120 can then encode the master streams for their assigned broadcast channel to produce the ABR streams at their respective assigned bitrate. The encoded streams can then be processed by the packagers 330, which can provide the encoded ABR content to the CDN 210 and the multicast servers 350 for delivery to the client devices 140. Additionally, the packagers 330 can provide client consumption information back to the ABR profile decision server 315, for use in refining the allocation of the video encoders 120 to the broadcast channels. In the depicted embodiment, the CDNs 210 can be configured to deliver the encoded ABR streams to particular client devices 140 using unicast transmissions, while the multicast servers 350 can be configured to deliver the encoded ABR streams to other client devices 140 using multicast transmissions. The client devices 140 can be configured to report back client consumption information to the ABR profile decision server 315. Such consumption information can include, for example, which broadcast channels are selected, which ABR streams are selected, and so on. The ABR profile decision server 315 could then use such information to refine the allocation of video encoders 120 to the broadcast channels.

Figure 4:
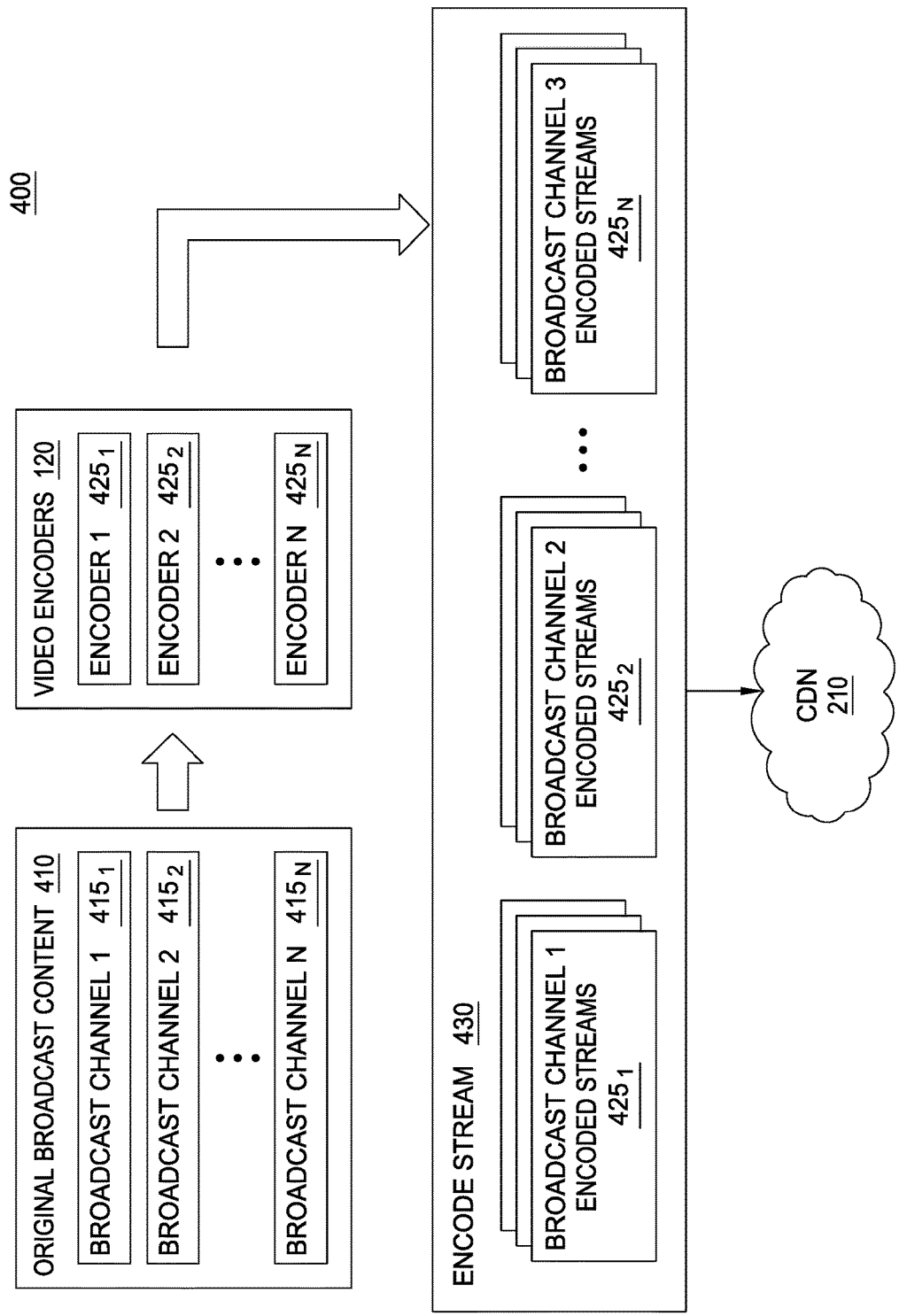
FIG. 4 illustrates a workflow for providing encoded ABR video content for a plurality of broadcast channels, according to one embodiment described herein.

FIG. 4 illustrates a workflow for providing encoded ABR video content for a plurality of broadcast channels, according to one embodiment described herein. As shown, the workflow 400 illustrates original broadcast content 410 (also referred to herein as master streams for broadcast channels), video encoders 120, encoded streams 430 and CDN 210. Generally, the ABR profile decision server 315 can determine an optimal encoding of the video encoders 120, such that no less than a minimum threshold and no more of a maximum threshold of the encoders $415_{1-N}$ is assigned to each of the broadcast channels $415_{1-N}$. The encoded ABR video streams 430 produced by the encoders $415_{1-N}$, depicted as the broadcast channel encoded streams $425_{1-N}$, can then be provided to CDN 210 for distribution to client devices. As discussed above, the CDN 210 can be configured to provide the encoded streams 430 to the client devices using various techniques (e.g., unicast communications, multicast communications, etc.). In a particular embodiment, the CDN 210 is configured to transmit requested streams to the client devices using unicast communications, and the encoded streams 430 can also be provided to a multicast server (not shown) for transmission to client devices using multicast communications.

Figure 5A:
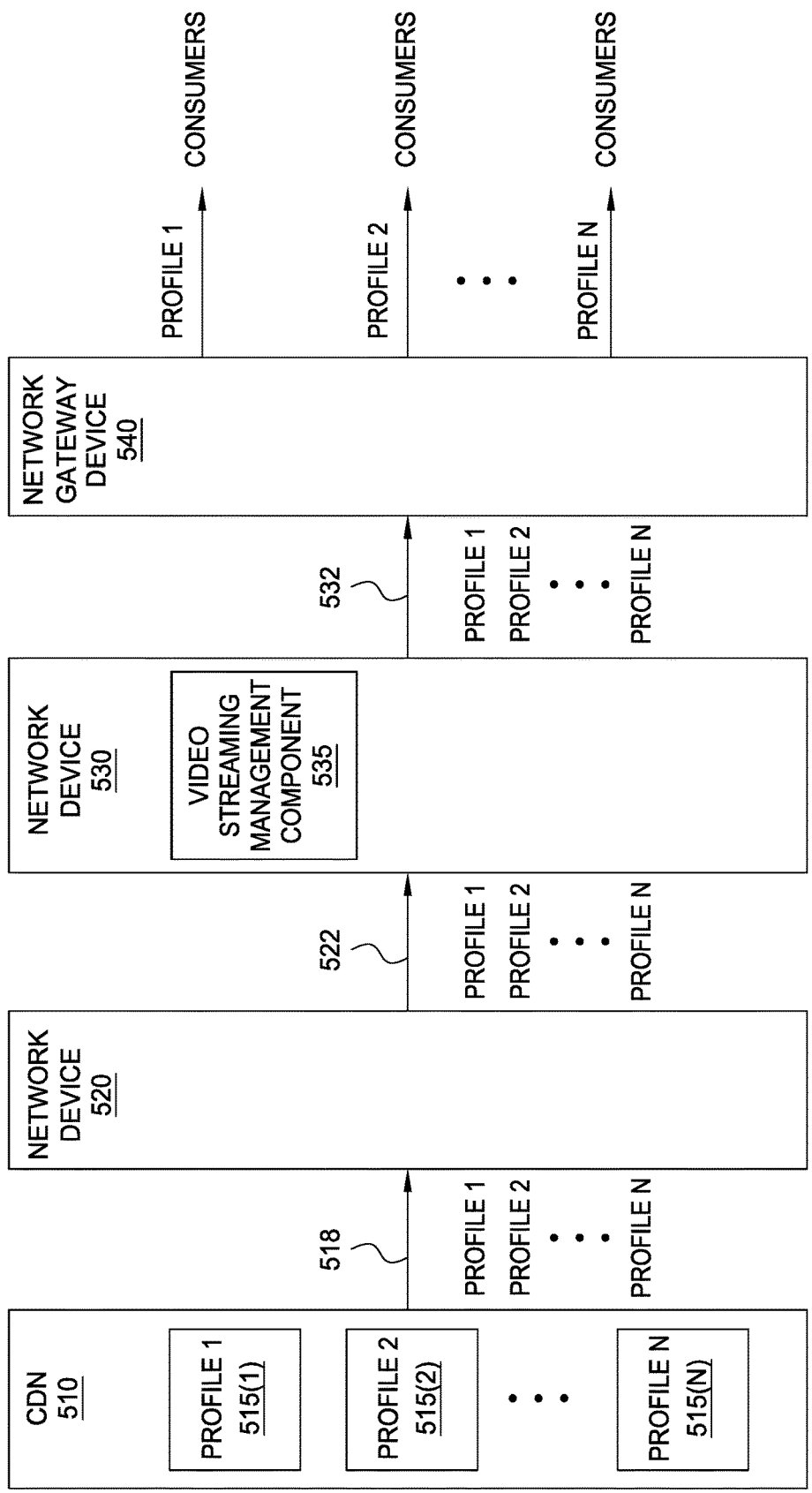
FIGS. 5A-B are block diagrams illustrating a method of throttling network traffic to induce a change in streaming video profile selection, according to one embodiment described herein.
Figure 5B:
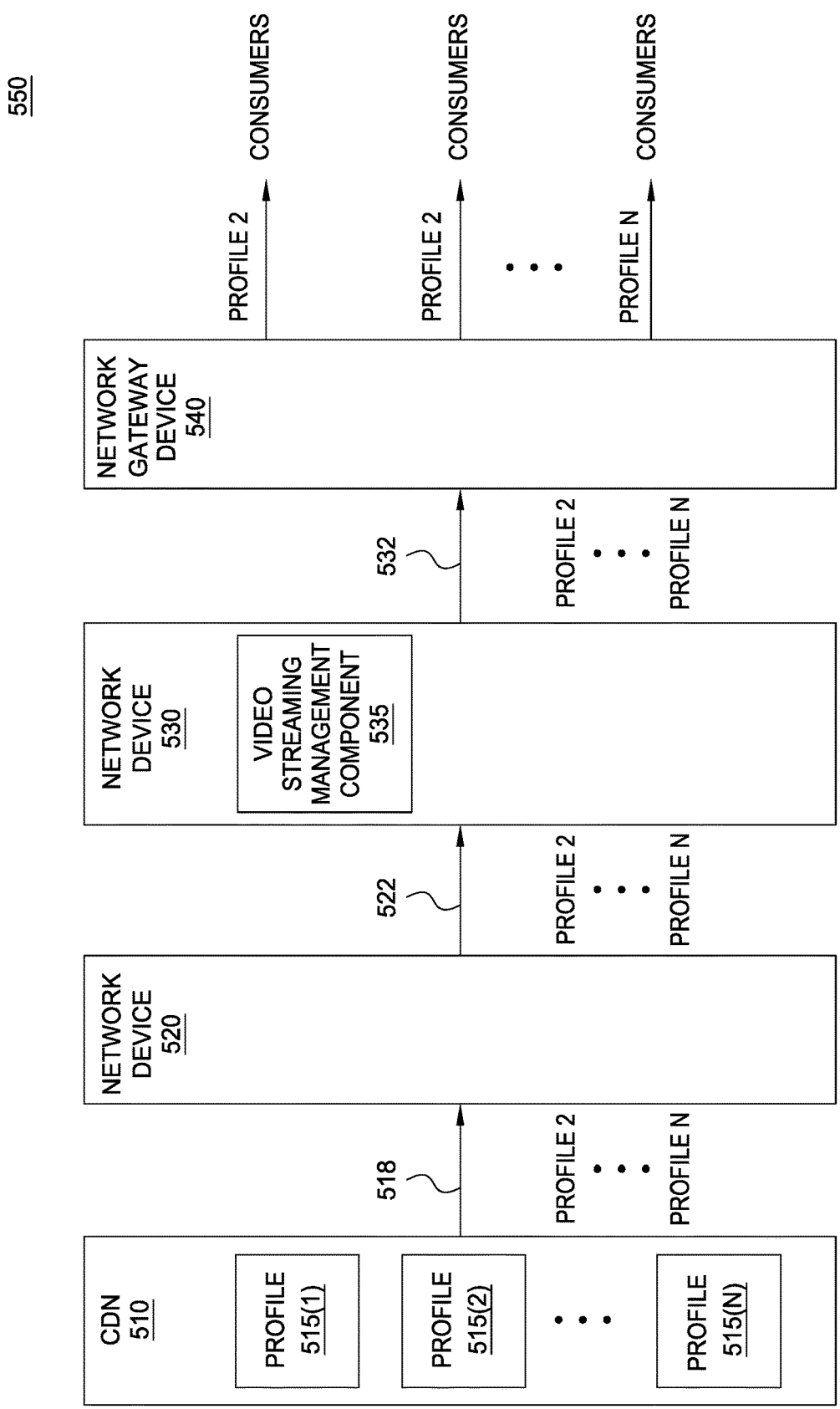

FIGS. 5A-B are block diagrams illustrating a method of throttling network traffic to induce a change in streaming video profile selection, according to one embodiment described herein. As shown in FIG. 5A, the diagram 500 includes a CDN 510, a network device 520, a network device 530, and a network gateway device 540. The CDN 510 is configured to transmit data packets for a given video channel (or instance of live video content), according to the ABR profiles 515(1)-(N). Generally, each of the ABR profiles 515(1)-(N) corresponds to a respective encoding of the video data for the video channel (e.g., in a respective bitrate).

In the depicted embodiment, the network device 520 and 530 are shown as subscribing to UDP packets for all of the profiles 515(1)-(N). For example, the network device 520 is receiving multicast data packets for the profiles 515(1)-(N) over the link 518, the network device 530 is receiving multicast data packets for the profiles 515(1)-(N) over the link 522, and the network gateway device 540 is receiving multicast data packets for the profiles 515(1)-(N) over the link 532. As further depicted, the network device 530 is configured with a video streaming management component 535. Moreover, the network gateway device 540 is shown as providing ABR profiles 1-N to a plurality of consumers. For example, the network gateway device 540 could be a gateway device for a user's home network, and the consumers could be various devices (e.g., set top boxes, mobile device, tablet computing devices, laptop computing devices, etc.) on the user's home network.

For purposes of the present example, assume that the link 522 between the network devices 520 and 530 becomes congested. Such congestion can be the result of additional network traffic on the link 522, problems on the link 522 (e.g., due to an increased rate of packet loss on the link 522), and so on. However, for purposes of this example, assume that the link 522 is congested such that there is not sufficient bandwidth remaining for the UDP packets for all of the profiles 515(1)-(N) to be transmitted in time for the consumers to playback the video data within the packets on schedule (i.e., without buffer underrun).

In such a situation, the video streaming management component 535 can monitor data communications passing through the network device 530 and can determine a measure of network error. For example, the video streaming management component 535 can monitor for FEC requests and/or retransmission requests from the consumers, indicating that the consumers received erroneous data (e.g., in the result of FEC requests) or that the consumers have determined that the data for the video segment at the current ABR profile will not be received in time for playback of the video data (e.g., a request transmitted to the CDN 210 where the consumer has cancelled the download of the current video segment and requested a video segment at a lower bitrate ABR profile).

In one embodiment, the video streaming management component 535 is configured to receive data describing the status of an upstream communications link from an upstream network device. For example, the network device 520 could transmit data to the network device 530, describing network metrics of the link 518 between the network device 520 and the CDN 510. Such data could be used in addition to or in lieu of the data collected by monitor the network traffic between the consumers and the CDN 510.

Upon determining that the network state information satisfies one or more criteria, the video streaming management component 535 could throttle data communications from the network device 530 to the downstream network gateway device 540. For example, the video streaming management component 535 could reduce the rate at which data packets are transmitted between the network device 530 and the network gateway device 540, to create the appearance of reduced network bandwidth for the consumers. That is, because in a multicast video streaming environment the consumers are receiving data packets from a cache on the network gateway device 540, the consumers may perceive the bandwidth of the entire network between the consumers and the CDN 510 as the speed of the link between the consumers and the network gateway device 540 (i.e., the local link). However, as discussed above, such a perception is based on incomplete information and cannot account for network congestion between the upstream network devices (e.g., between the network devices 520 and 530. As such, by reducing the rate at which the data packets are provided to the network gateway device 540 (and thus reducing the rate at which the data packets are placed into the cache of the network gateway device 540), the video streaming management component 535 can indirectly influence the consumers to switch to a lower ABR profile for the video stream, in response to a perceived reduction in network bandwidth.

An example of this is shown in FIG. 5B, where the diagram 550 illustrates that all of the consumers have switched from the ABR profile 515(1) (e.g., the highest bitrate ABR profile) and now are requesting only the profiles 515(2)-(N). By doing so, the video streaming management component 535 has reduced the network congestion on the link 522 between the network devices 520 and 530, as the link 522 is no longer sending UDP data packets for the ABR profile 515(1). In the event the video streaming management component 535 determines an updated measure of network error (e.g., a retransmission request rate from the consumers) is still too high (or otherwise satisfies one or more predefined criteria), the video streaming management component 535 can further throttle the transmission of data packets on the link 532 between the network device 530 and the network gateway device 540, in order to further induce the consumers to switch to an even lower bitrate ABR profile. Likewise, if the video streaming management component 535 determines that the measure of network error is sufficiently low and that additional upstream bandwidth is available, the video streaming management component 535 could throttle up the transmission of the data packets between the network device 530 and the network gateway device 540, to induce the consumers to switch to a higher bitrate ABR profile. Doing so takes advantage of the network bandwidth that is currently available and helps to ensure an optimal video streaming experience for the consumers.

Figure 6:
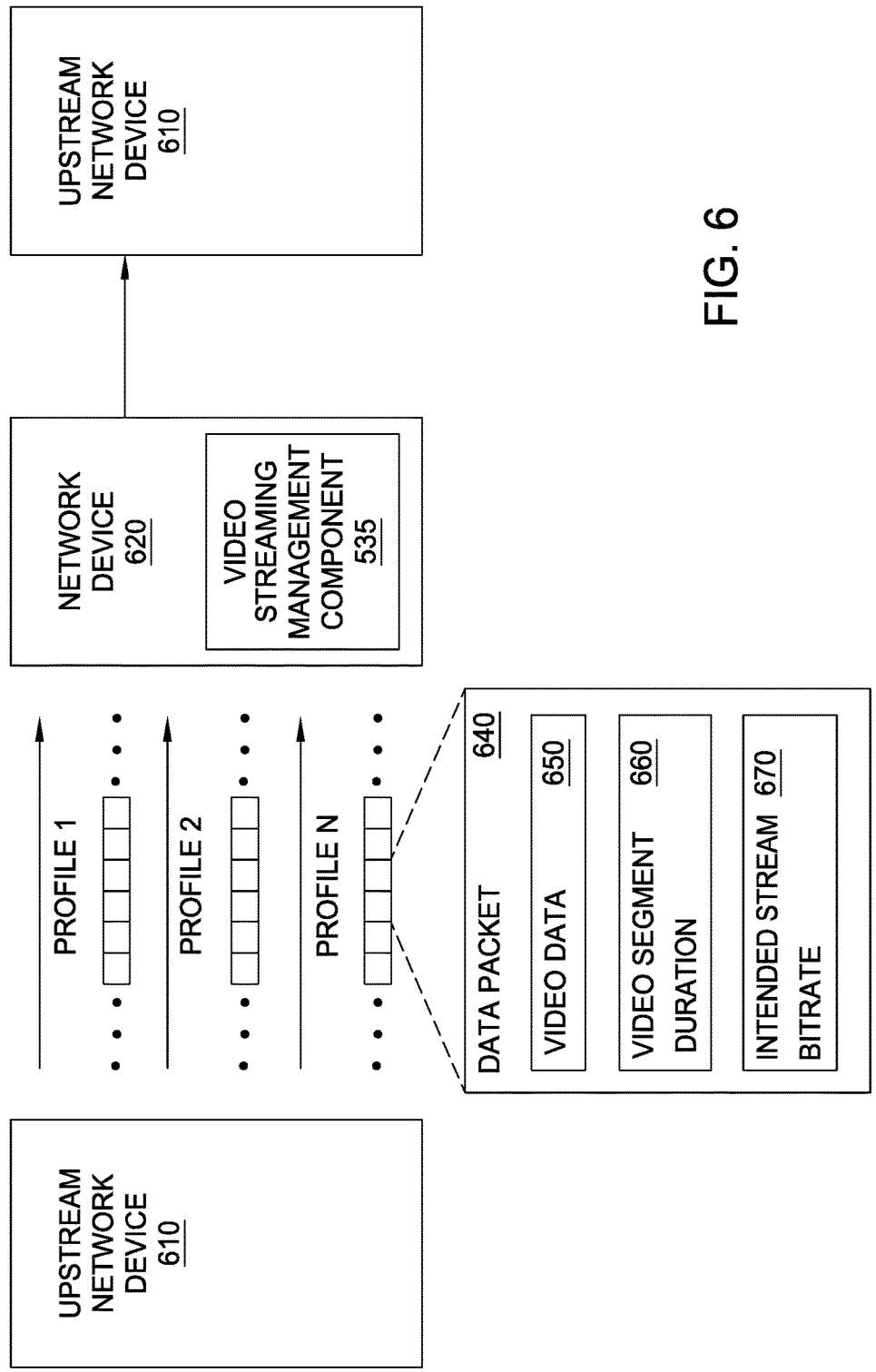
FIG. 6 is a block diagram illustrating a video streaming environment configured with a video streaming management component, according to one embodiment described herein.

FIG. 6 is a block diagram illustrating a video streaming environment configured with a video streaming management component, according to one embodiment described herein. As shown, the diagram 600 includes an upstream network device 610, a network device 620 and a downstream network device 630. The network device 620 is configured with the video streaming management component 535. In the depicted embodiment, the network device 620 is subscribing to UDP data packets for ABR profiles 1-N, and each data packet 640 includes a payload containing video data 650 for a video segment, an indication of a video segment duration 660 of the video segment and an intended stream bitrate 670 for the video stream for the corresponding video profile.

As discussed above, the video streaming management component 535 could monitor for a measure of network error (e.g., a measure of retransmission requests from downstream video content consumers) and, upon determining that the measure of network error satisfies one or more criteria (e.g., exceeding a threshold measure of network error), the video streaming management component 535 could throttle the transmission of data packets to the downstream network device 630, so as to cause downstream consumers of the data packets to request lower bitrate ABR profiles for the video stream. For example, the video streaming management component 535 could throttle the rate at which the data packets are transmitted to the downstream network device 630, to a transmission rate calculated according to a predefined transfer function. Continuing the example, the predefined transfer function could take as inputs the video segment duration 660 and intended stream bitrate 670 of the data packet 640, as well as an amount of time taken to receive the data packet 640 by the network 620, in estimating the transmission rate to use in throttling the transmission of the data packet 640 to the downstream network device 630.

Figure 7A:
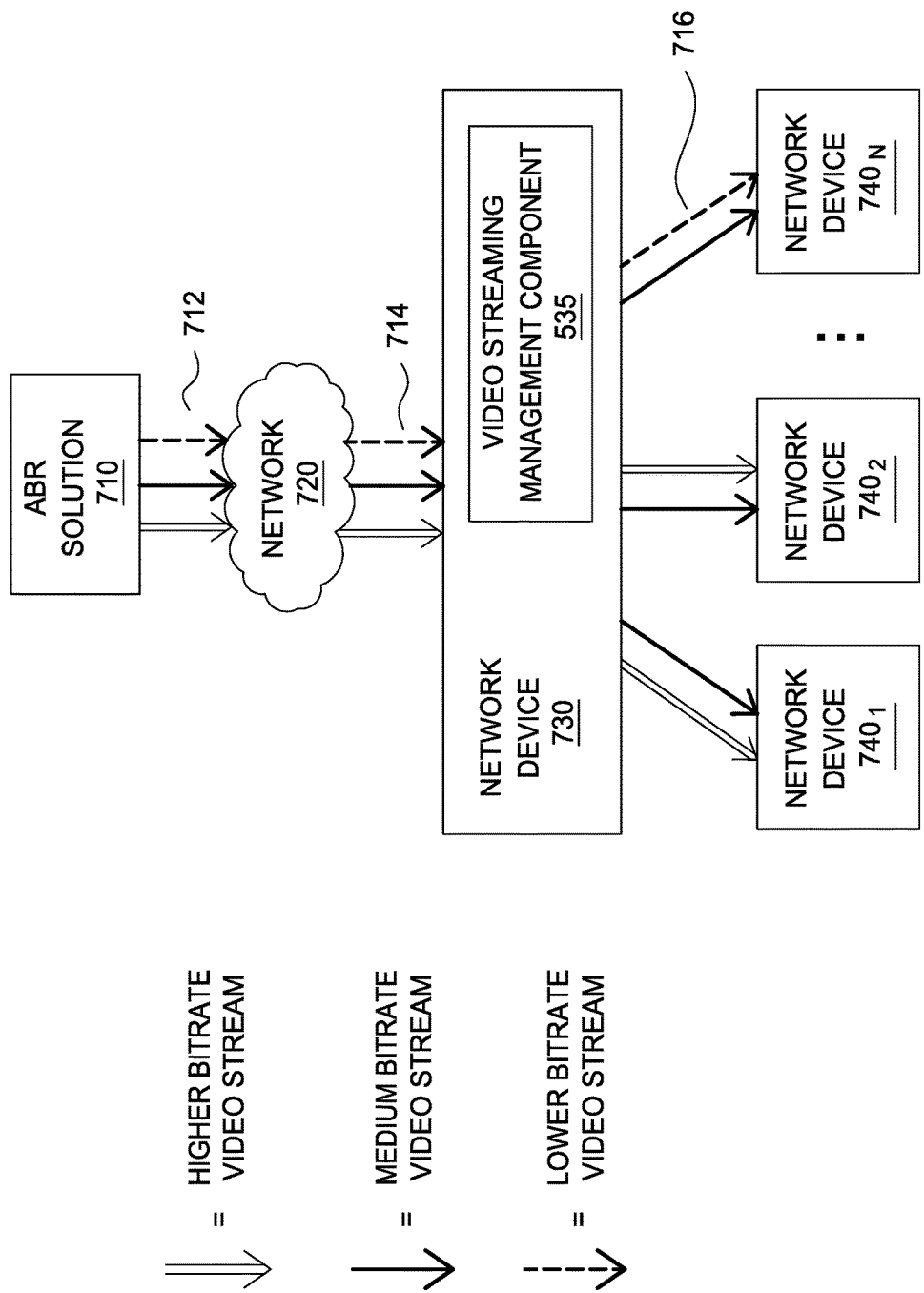
FIGS. 7A-B are diagrams illustrating a downward shift in streaming video profile selection based on a measure of upstream network congestion, according to an embodiment described herein.
Figure 7B:
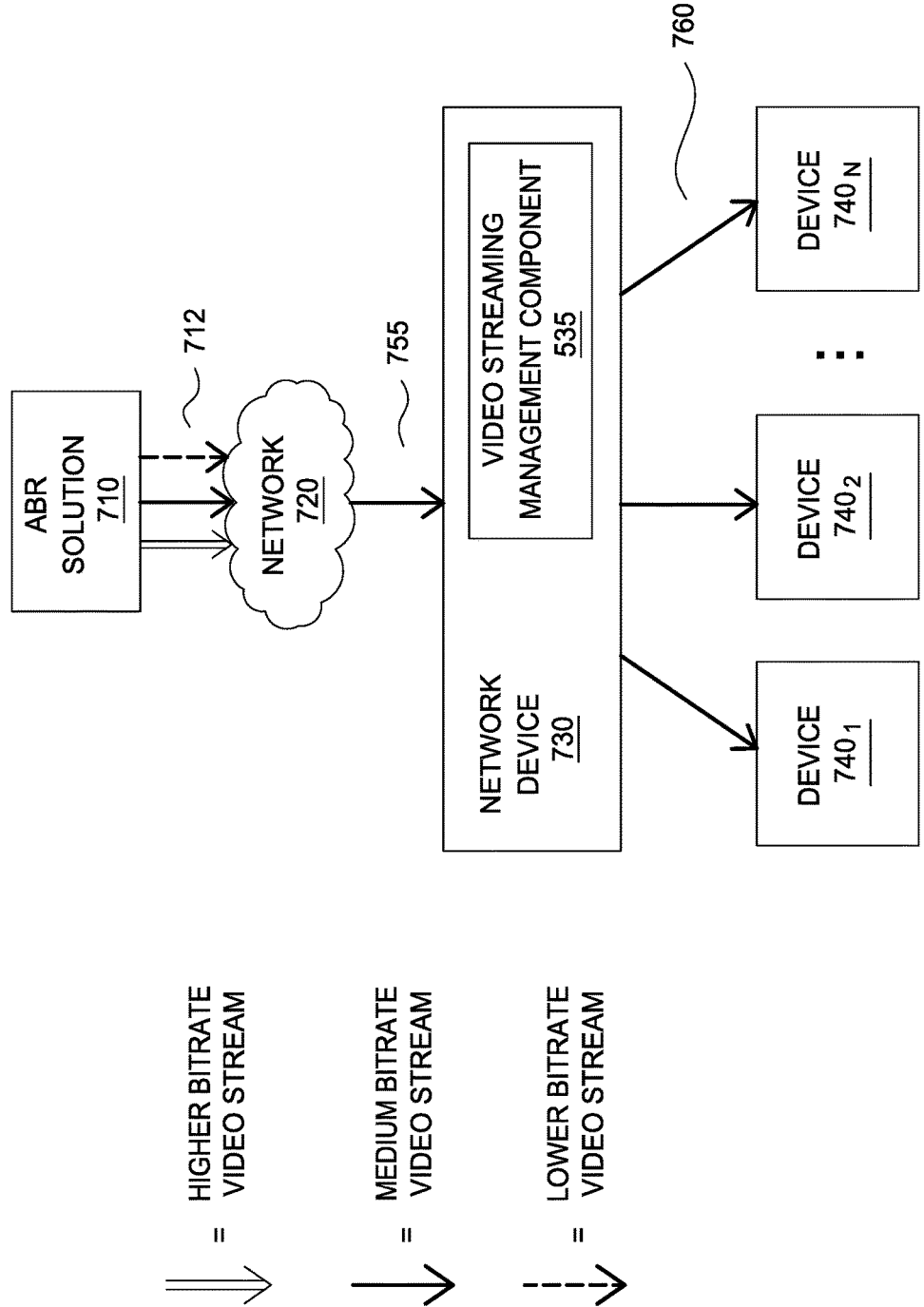

FIGS. 7A-B are diagrams illustrating a downward shift in streaming video profile selection based on a measure of upstream network congestion, according to an embodiment described herein. As shown, the diagram 700 illustrates a network environment that includes an ABR solution 710, a network 720, a network devices 730 and a plurality of downstream network devices $740_{1-N}$. The network device 730 is configured with the video streaming management component 535. In the depicted embodiment, the network devices are, in the aggregate, subscribing to the higher, medium and lower bitrate video streams from the network device 730, for a given instance of video content, as illustrated by the arrows 716. As such, the network device 730 has subscribed to UDP packets from a device (not shown) the network 720, for the higher, medium and lower bitrate video streams, as illustrated by the arrows 714. And similarly, another device (not shown) within the network 720 has subscribed to UDP packets from the ABR solution 710, for the higher, medium and lower bitrate video streams.

Where all of the links within the network environment 700 have ample bandwidth, the depicted streaming arrangement may continue without issue. However, when a link in the network becomes congested (e.g., the link between the network 720 and the network device 730), conventional network environments may not handle such congestion gracefully. That is, the downstream consumers of the data packets for the video streams may request packets according to ABR profiles that are determined based on the consumers' perception of the available network bandwidth. However, where those consumers are receiving the data packets from a cache on a network device (e.g., one of network devices $740_{1-N}$, the consumers may perceive the available network bandwidth to be the bandwidth of the local network connection between the consumer and the caching device, rather than the weakest link of the network environment 700 as a whole. As such, the consumers may struggle to select an optimal network bandwidth and, in many circumstances, may further complicate the network congestion problem, as some consumers may resort to TCP communications with the ABR solution 710, thereby adding to the workload of the network links between the consumers and the ABR solution 710.

As such, the video streaming management component 535 can be configured to determine a measure of network error at the network device 730 for a given video stream. For example, the video streaming management component 535 could monitor retransmission requests from downstream consumers passing through the network device 730. The video streaming management component 535, upon determining that the network state information satisfies one or more criteria, could throttle data communications from the network device 730 to a downstream network device $740_{1-N}$ for the video stream corresponding to the first video streaming profile. For example, the video streaming management component 535 could compute a reduced transmission rate at which to transmit data packets for the video stream, according to a transfer function that takes as input an amount of time it took the network device 730 to receive the corresponding data packets, as well as an intended bitrate of the video stream to which the data packets belong and an estimated duration of a video segment to which the payload of the packets belongs. The video streaming management component 535 could then throttle the transfer of the data packets to the determined transmission rate, so as to create a perception of decreased bandwidth for the downstream consumers of the packets. That is, because the packets will reach the cache at a reduced rate slowly, the consumers will perceive the available network bandwidth to be less, and will tend to select a lower bitrate ABR profile.

An example of this is shown in FIG. 7B, where the network environment 750 illustrates that the links between the network device 730 and the network 720, as well as the links between the downstream devices $740_{1-N}$ and the network device 730 have switched to the medium bitrate video stream. Thus, as opposed to the network environment 700 where the links 714 and 716 were transmitting UDP packets for the higher, medium and lower bitrate video streams, the links 755 and 760 are transmitting only data packets for the medium bitrate stream. Doing so helps to relieve the congestion on the link between the network 720 and the network device 730, and thereby improves the streaming experience for the downstream consumers of the data packets.

Figure 8:
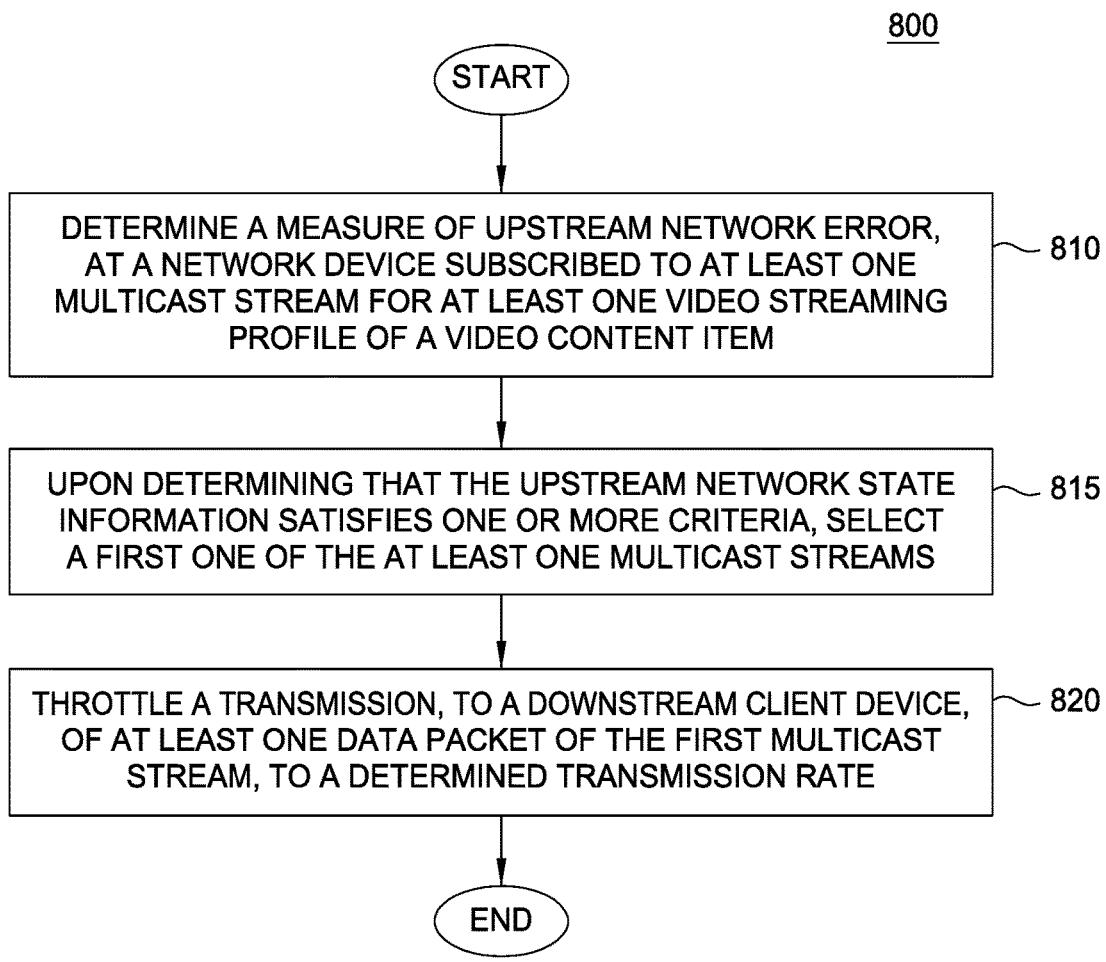
FIG. 8 is a flow diagram illustrating a method of inducing client devices to change streaming video profiles, according to one embodiment described herein.

FIG. 8 is a flow diagram illustrating a method of inducing client devices to change streaming video profiles, according to one embodiment described herein. As shown, the method 800 begins at block 810, where a video streaming management component 535 determines a measure of upstream network error, at a network device subscribed to at least one multicast stream for at least one video streaming profile of a video content item. Upon determining that the upstream network state information satisfies one or more criteria, the video streaming management component 535 selects a first one of the at least one video streams (block 815) and throttles a transmission, to a downstream network device, of at least one data packet of the first video stream, to a determined transmission rate (block 820). For example, the video streaming management component 535 could determine that a retransmission request rate exceeds a predefined threshold. Such a retransmission request rate exceeding a threshold can indicate, for example, that the client devices are struggling to maintain the playback of the video stream at the bit rate decline devices are determining is optimal. As discussed above, this can occur because the client devices by making decisions with based on the state of their local network and not the network as a whole.

In response, the video streaming management component 535 could determine a reduced transmission rate at which to transmit the data packets using a predefined transfer function. Continuing the example, such a predefined transfer function could take as inputs a length of a video segment to which the packets belong and an intended bit rate for the video stream. The video streaming management component 535 could analyze these attributes, using the transfer function, to determine the reduced transmission rate for transmitting the data packets, in order to influence downstream client devices to shift to a lower bit rate ABR profile. For example, the video streaming management component 535 could throttle the transmission of the data packets to the downstream client device, such that the packets are transmitted at a transmission rate that is insufficient to maintain the playback of the video content at the current bit rate. By doing so, the video streaming management component 535 can indirectly cause video streaming clients to, by their own volition, select a lower bitrate ABR profile for the video stream.

Figure 9:
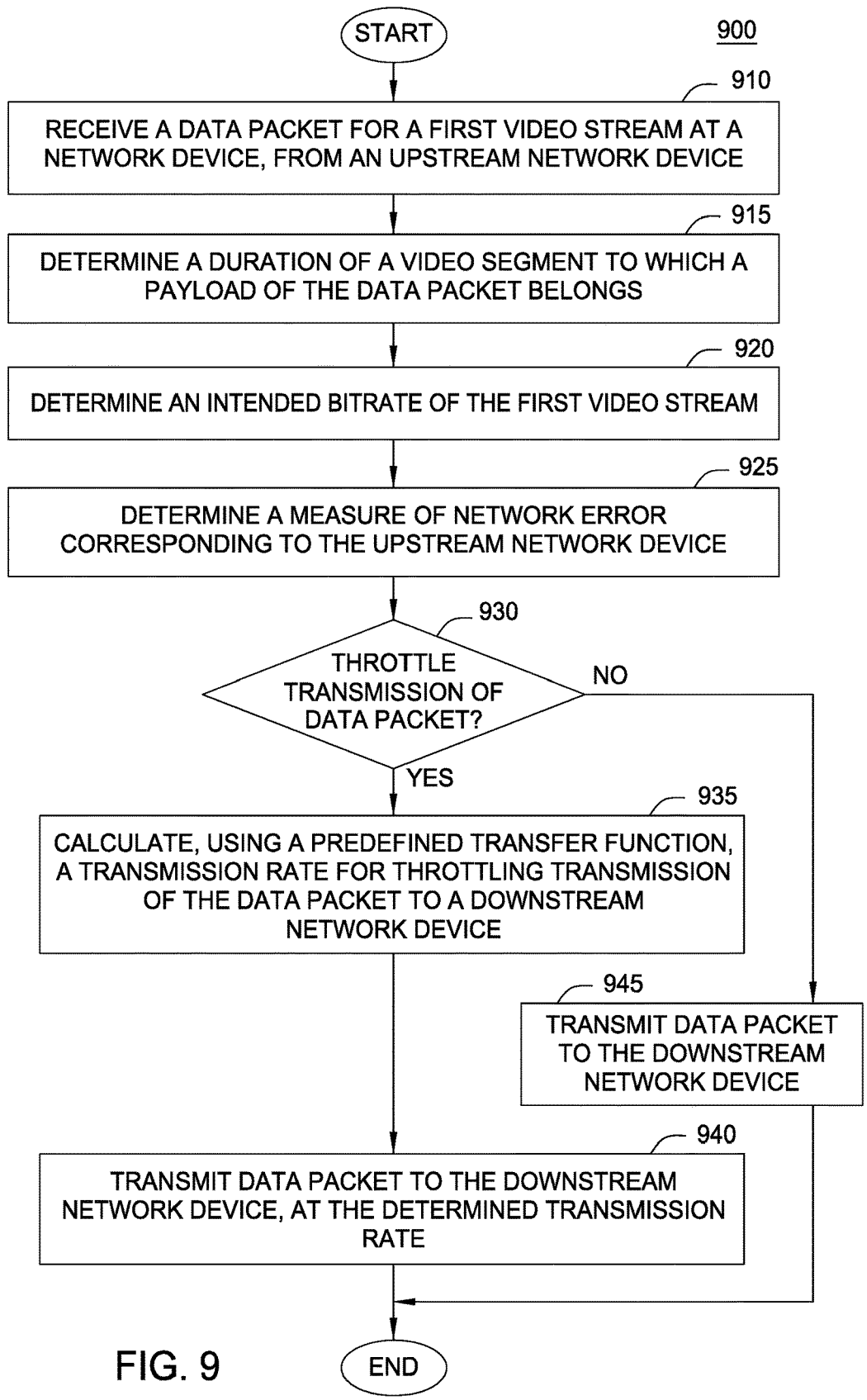
FIG. 9 is a flow diagram illustrating a method of selectively throttling network traffic to client devices based on measures of upstream network congestion, according to one embodiment described herein.

FIG. 9 is a flow diagram illustrating a method of selectively throttling network traffic to client devices based on measures of upstream network congestion, according to one embodiment described herein. As shown, the method 900 begins at block 910, where the video streaming management component 535 receives a data packet for first video stream at a network device, from an upstream network device. The video streaming management component 535 determines a duration of a video segment to which a payload of the data packet belongs (block 915). For example, a content provider of the video content could have inserted the duration of the video segment into a field within a header of the data packet additionally, the video streaming management component 535 determines an intended bit rate of the first video stream to which the data packet belongs (block 920). Such bit rate information could be specified, for example, in a field within a header of the data packet.

The video streaming management component 535 determines a measure of network error corresponding to the upstream network device (block 925). For example, the video streaming management component 535 could monitor retransmission requests passing through the network device, from downstream network clients to an upstream network content provider. As discussed above, such retransmission requests are generally indicative of one or more downstream network clients struggling to maintain playback of the video stream at the selected bit rate. In one embodiment, such a measure of network error is based on network data metrics received from the upstream network device. For instance, such network data metrics can include a measure of network bandwidth for one or more links of the upstream network device, a measure of available network throughput for the one or more links of the upstream network device, a measure of latency and/or jitter on the one or more links, a measure of packet loss for the one or more links, and so on.

A decision block 930, the video streaming management component 535 determines whether or not to throttle transmission of the received data packet for the first video stream to a downstream network device. For example, if the video streaming management component 535 determines that the measure of network error is sufficiently low, the video streaming management component 535 could determine that it does not need to provide any assistance for the network at this time and thus could transmit the data packet to a downstream client device at the fastest available rate (block 945).

On the other hand, if the video streaming management component 535 determines that the measure of network error is sufficiently high, or more generally that one or more predefined criteria are satisfied by a current state of the network device, the video streaming management component 535 calculates, using a predefined transfer function, a reduced transmission rate for use in throttling the transmission of the data packet to the downstream network device (block 935). The video streaming management component 535 transmits the data packet to the downstream network device and throttles the transmission to the determined transmission rate (block 940). For example, the video streaming management component 535 could throttle the transmission of data packets to the downstream device, so as to create the appearance that less bandwidth is available for downstream client devices to stream video content, than is actually be available on the downstream client devices' local connection. As an example, a downstream client device could be in practice retrieving data packets from a local network gateway device's cache, and generally speaking the network connection between the client device and the local network gateway device could have ample bandwidth for transmitting the video packets. By throttling the transmission of the data packets to the downstream client devices, the video streaming management component 535 can create the appearance of reduced bandwidth for the client devices, thereby influencing the client devices to shift to a reduced bit rate stream.

Figure 10:
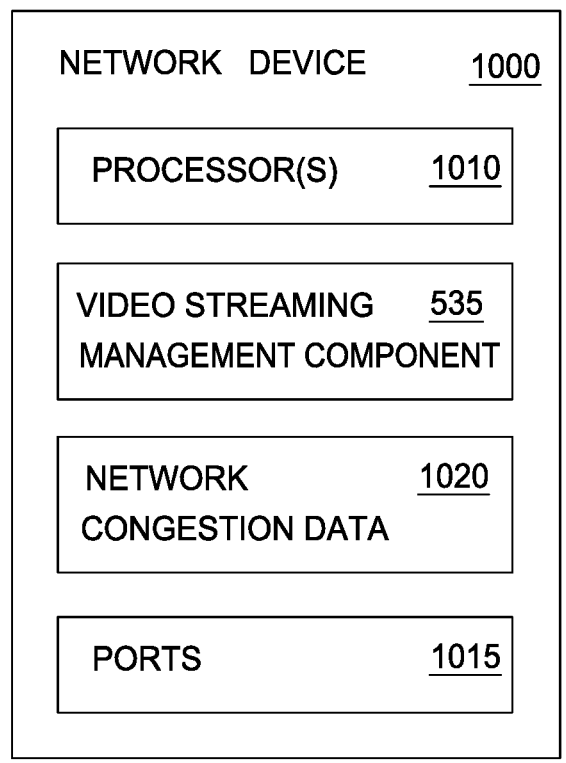
FIG. 10 is a block diagram illustrating a network device configured with a video streaming management component, according to one embodiment described herein.

FIG. 10 illustrates a network device configured with video streaming management logic, according to one embodiment described herein. As shown, the network device 1000 includes, without limitation, processors 1010, video streaming management logic (also referred to herein as video streaming management component 535), network congestion data 1020 and communication ports 1015. The processor 1010 may be any processing element capable of performing the functions described herein. The processor 1010 represents a single processor, multiple processors, a processor with multiple cores, and combinations thereof. The network congestion data 1020 may contained with a memory device (not shown), which may be either volatile or non-volatile memory and may include RAM, flash, cache, disk drives, and the like. The network device may also include a control plane for configuring and managing the forwarding logic.

Generally, the network congestion data 1020 represents data collected by the video streaming management component 535 that describes a network state of the network device 1000. For example, the network congestion data 1020 could specify a retransmission request rate of one of more downstream clients of the network device 1000. The video streaming management component 535 could receive multicast network communications for a first video streaming profile, of a plurality of video streaming profiles, for a video content item. For instance, the network device 100 could be subscribed to multicast communications from an upstream network device, for a video stream corresponding to the first video streaming profile. As an example, the video streaming management component 535 could subscribe to the multicast communications for the video stream, responsive to a request for the first video streaming profile from a downstream client device.

The video streaming management component 535 could determine a measure of network error at the network device. For example, the video streaming management component 535 could analyze the network congestion data 1020 to determine a retransmission request rate of the downstream client device(s). Upon determining that the network state information satisfies one or more criteria, the video streaming management component 535 could throttle data communications from the network device to a downstream client device for the video stream corresponding to the first video streaming profile. For example, the video streaming management component 535 could throttle the transmission of data packets for the video stream to the downstream client device to a reduced transmission rate, in order to influence the downstream client device to switch to a lower bitrate streaming video profile than the first video streaming profile. Doing so enables the downstream clients to account for upstream network interruptions and congestion.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A computer-implemented method of adaptive video streaming over multicast, the computer-implemented method comprising:

receiving, at a network device via User Datagram Protocol (UDP), multicast network communications for a first bitrate encoding, of a plurality of bitrate encodings of distinct bitrates, for a video content item requested by a downstream client device and provided by a content source, wherein the network device is subscribed to multicast communications from an upstream network device, for a video stream corresponding to the first bitrate encoding;

subsequent to transmitting unicast network communications for the video content item to the downstream client device via UDP at a first transmission rate, determining network state information at the network device that specifies at least a measure of upstream network congestion;

upon determining, by operation of one or more computer processors, that the network state information satisfies one or more criteria, preventing exacerbation of the upstream network congestion otherwise configured to occur due to the downstream client device resorting to requesting unicast network communications for the video content item from the content source via Transmission Control Protocol (TCP), wherein the exacerbation of the upstream network conqestion is prevented by throttling at least unicast network communications via UDP from the network device to the downstream client device such that one or more data packets of for the video stream are transmitted at a second transmission rate lower than the first transmission rate; and subsequent to determining that the downstream client device has not, within a predefined window of time since throttling the unicast network communications, requested any bitrate encoding of a lower bitrate than the first bitrate encoding, further throttling unicast network communications to the downstream client device such that at least one subsequent data packet of the video stream is transmitted at a third transmission rate lower than the second transmission rate.

2. The computer-implemented method of claim 1, wherein throttling the unicast network communications from the network device to the downstream client device further comprises:

determining a transmission rate for use in throttling the unicast network communications, wherein the transmission rate comprises the second transmission rate.

3. The computer-implemented method of claim 2, wherein the determined transmission rate is determined based on a predefined transfer function that takes as input, at least in part, the network state information.

4. The computer-implemented method of claim 3, wherein the predefined transfer function is a non-linear function.

5. The computer-implemented method of claim 3, wherein at least one data packet of the video stream specifies a duration of a video segment to which the packet belongs and an intended bitrate for the video stream, wherein at least a portion of the video segment is contained within the at least one data packet.

6. The computer-implemented method of claim 1, wherein the network state information comprises at least one of (i) a measure of upstream network congestion, (ii) a measure of a network retransmission rate, (iii), a measure of an upstream network delay, relative to a playback time of one or more data packets for the video stream, and (iv) a measure of latency at an upstream network device.

7. The computer-implemented method of claim 1, wherein the throttling of the unicast network communications is performed despite a network connection between the network device and the downstream client device having sufficient available network bandwidth to transmit the at least one data packet to the downstream client device at a rate higher than the second transmission rate.

8. The computer-implemented method of claim 1, wherein the or more criteria comprise a determination that the measure of upstream network congestion exceeds a determined threshold measure of network congestion.

9. The computer-implemented method of claim 1, wherein upon the throttling of the data unicast network communications, the downstream client device accepts the second transmission rate of unicast network communications for the video content item via UDP without resorting to requesting unicast network communications for the video content item from the content source via TCP.

10. The computer-implemented method of claim 9, wherein the exacerbation of the upstream network congestion is due to the upstream network device having to engage in, for the video content item, unicast network communications via TCP in addition to multicast network communications via UDP, when the upstream network congestion is already present;

wherein throttling the unicast network communications from the network device to the downstream client device comprises determining a transmission rate for use in throttling the unicast network communications, the determined transmission rate comprising the second transmission rate.

11. The computer-implemented method of claim 10, wherein the second transmission rate is determined based on a predefined transfer function that takes as input, at least in part, the network state information, wherein the predefined transfer function is a non-linear function;

wherein at least one data packet of the video stream specifies a duration of a video segment to which the packet belongs and an intended bitrate for the video stream, wherein at least a portion of the video segment is contained within the at least one data packet;

wherein the predefined transfer function takes as input the duration of the video segment and the intended bitrate for the video stream corresponding to the first bitrate encoding.

12. The computer-implemented method of claim 11, wherein the predefined transfer function further takes as input an amount of time taken to receive at least one data packet, at the network device, from the upstream network device;

wherein the predefined transfer function is adapted to cause the downstream client device to shift to a second bitrate encoding of the plurality of bitrate encodings, as a result of a perceived lack of bandwidth on a network connection between the network device and the downstream client device.

13. The computer-implemented method of claim 12, wherein the throttling of the unicast network communications is performed despite a network connection between the network device and the downstream client device having sufficient available network bandwidth to transmit the at least one data packet to the downstream client device at a rate higher than the second transmission rate;

wherein the one or more criteria comprise a determination that the measure of upstream network congestion exceeds a determined threshold measure of network congestion, wherein the determination that the measure of upstream network congestion exceeds the determined threshold measure of network congestion further comprises determining that a number of retransmission requests received from the downstream client device exceeds a predefined threshold number of retransmission requests.

14. The computer-implemented method of claim 13, wherein the network state information comprises (i) a measure of upstream network congestion, (ii) a measure of a network retransmission rate, (iii), a measure of an upstream network delay, relative to a playback time of one or more data packets for the video stream, and (iv) a measure of latency at an upstream network device.

15. A network device that implements adaptive video streaming over multicast, the network device comprising:
one or more computer processors; and
logic encoded on a non-transitory medium, the logic executable by operation of the one or more computer processors to perform an operation comprising:
receiving, via User Datagram Protocol (UDP) from an upstream network device, multicast network communications for a first bitrate encoding, of a plurality of bitrate encodings of distinct bitrates, for a video content item requested by a downstream client device and provided by a content source, wherein the network device is subscribed to multicast communications from the upstream network device, for a video stream corresponding to the first bitrate encoding;

subsequent to transmitting unicast network communications for the video content item to the downstream client device via UDP at a first transmission rate, determining network state information at the network device that specifies at least a measure of upstream network congestion;

upon determining that the network state information satisfies one or more criteria, preventing exacerbation of the upstream network congestion otherwise configured to occur due to the downstream client device resorting to requesting unicast network communications for the video content item from the content source via Transmission Control Protocol (TCP), wherein the exacerbation of the upstream network congestion is prevented by throttling at least unicast network communications via UDP from the network device to the downstream client device such that one or more data packets of for the video stream are transmitted at a second transmission rate lower than the first transmission rate; and subsequent to determining that the downstream client device has not, within a predefined window of time since throttling the unicast network communications, requested any bitrate encoding of a lower bitrate than the first bitrate encoding, further throttling unicast network communications to the downstream client device such that at least one subsequent data packet of the video stream is transmitted at a third transmission rate lower than the second transmission rate.

16. The network device of claim 15, wherein throttling the unicast network communications from the network device to the downstream client device further comprises:

determining a transmission rate for use in throttling the unicast network communications, based on a predefined transfer function that takes as input, at least in part, the network state information, wherein the predefined transfer function is a non-linear function, wherein the transmission rate comprises the second transmission rate.

17. The network device of claim 16, wherein at least one data packet of the video stream specifies a duration of a video segment to which the packet belongs and an intended bitrate for the video stream, wherein at least a portion of the video segment is contained within the at least one data packet, wherein the predefined transfer function takes as input the duration of the video segment and the intended bitrate for the video stream corresponding to the first bitrate encoding, and wherein the predefined transfer function further takes as input an amount of time taken to receive at least one data packet, at the network device, from the upstream network device.

18. The network device of claim 17, wherein the predefined transfer function is adapted to cause the downstream client device to shift to a second bitrate encoding of the plurality of bitrate encodings, as a result of a perceived lack of bandwidth on a network connection between the network device and the downstream client device.

19. The network device of claim 15, wherein the network state information comprises at least one of (i) a measure of upstream network congestion, (ii) a measure of a network retransmission rate, (iii), a measure of an upstream network delay, relative to a playback time of one or more data packets for the video stream, and (iv) a measure of latency at an upstream network device, and wherein the throttling of the unicast network communications is performed despite a network connection between the network device and the downstream client device having sufficient available network bandwidth to transmit the at least one data packet to the downstream client device at a rate higher than the second transmission rate.

20. A non-transitory computer-readable medium containing computer program code that, when executed, performs an operation to implement adaptive video streaming over multicast, the operation comprising:

receiving, at a network device via User Datagram Protocol (UDP), multicast network communications for a first bitrate encoding, of a plurality of bitrate encodings of distinct bitrates, for a video content item requested by a downstream client device and provided by a content source, wherein the network device is subscribed to multicast communications from an upstream network device, for a video stream corresponding to the first bitrate encoding;

subsequent to transmitting unicast network communications for the video content item to the downstream client device via UDP at a first transmission rate, determining network state information at the network device that specifies at least a measure of upstream network congestion;

upon determining, by operation of one or more computer processors when executing the computer program code, that the network state information satisfies one or more criteria, preventing exacerbation of the upstream network congestion otherwise configured to occur due to the downstream client device resorting to requesting unicast network communications for the video content item from the content source via Transmission Control Protocol (TCP), wherein the exacerbation of the upstream network congestion is prevented by throttling at least unicast network communications via UDP from the network device to the downstream client device such that one or more data packets of the video stream are transmitted at a second transmission rate lower than the first transmission rate; and subsequent to determining that the downstream client device has not, within a predefined window of time since throttling the unicast network communications, requested any bitrate encoding of a lower bitrate than the first bitrate encoding, further throttling unicast network communications to the downstream client device such that at least one subsequent data packet of the video stream is transmitted at a third transmission rate lower than the second transmission rate.

* * * * *

UNITED STATES PATENT AND TRADEMARK OFFICE
CERTIFICATE OF CORRECTION

PATENT NO. : 10,355,998 B2  
APPLICATION NO. : 15/442924  
DATED : July 16, 2019  
INVENTOR(S) : Thomas P. Burnley Page 1 of 1

It is certified that error appears in the above-identified patent and that said Letters Patent is hereby corrected as shown below:

In the Specification

In Column 4, Line 19, delete "that that" and insert -- that --, therefor.

In Column 7, Line 30, delete "220N" and insert -- $220_N$ --, therefor.

In Column 7, Line 45, delete "$240_1$.m" and insert -- $240_1$.m. --, therefor.

In the Claims

In Column 18, Line 64, in Claim 1, delete "conqestion" and insert -- congestion --, therefor.

In Column 19, Line 36, in Claim 6, delete "(iii)," and insert -- (iii) --, therefor.

In Column 19, Line 48, in Claim 8, after "the" insert -- one --.

In Column 20, Line 49, in Claim 14, delete "(iii)," and insert -- (iii) --, therefor.

In Column 22, Line 4, in Claim 19, delete "(iii)," and insert -- (iii) --, therefor.

Signed and Sealed this  
Fourteenth Day of January, 2020

Andrei Iancu  
*Director of the United States Patent and Trademark Office*